(12) United States Patent
Bibby

(10) Patent No.: US 8,365,895 B2
(45) Date of Patent: Feb. 5, 2013

(54) PRESSURE PLATE

(75) Inventor: Damian Bibby, Greensborough (AU)

(73) Assignee: Clutch Industries Pty Ltd, Thomastown, Victoria (AU)

(*) Notice: Subject to any disclaimer, the term of this patent is extended or adjusted under 35 U.S.C. 154(b) by 661 days.

(21) Appl. No.: 12/608,323

(22) Filed: Oct. 29, 2009

(65) Prior Publication Data

US 2011/0100778 A1     May 5, 2011

(51) Int. Cl.
    *F16D 13/72*     (2006.01)
(52) U.S. Cl. ............. 192/113.22; 192/70.12; 192/70.14
(58) Field of Classification Search ............. 192/70.12, 192/70.14, 107 R, 113.22, 113.23, 113.26
See application file for complete search history.

(56) References Cited

U.S. PATENT DOCUMENTS

| | | | |
|---|---|---|---|
| 4,529,074 A * | 7/1985 | Alas .......................... | 192/70.12 |
| 6,564,919 B2 * | 5/2003 | Diemer et al. ............ | 192/107 M |
| 6,892,870 B2 * | 5/2005 | Peterseim et al. ........ | 192/107 R |

FOREIGN PATENT DOCUMENTS

| | | | |
|---|---|---|---|
| DE | 19848583 A1 * | 4/2000 | |
| EP | 1394433 A1 * | 3/2004 | |
| WO | WO 2006000037 A1 * | 1/2006 | |

\* cited by examiner

*Primary Examiner* — David D Le
*Assistant Examiner* — Jacob S Scott
(74) *Attorney, Agent, or Firm* — Harness, Dickey & Pierce, P.L.C.

(57) ABSTRACT

A pressure plate for use in a friction clutch assembly comprises a substantially flat annular coupling face for frictional engagement with a coupling face of a clutch plate and one or more discontinuities formed in the coupling face of the pressure plate. The discontinuity(ies) decrease a greater relative proportion of the surface area closer to an inner radius of the coupling face of the pressure plate than an outer radius of the coupling face of the pressure plate to increase a mean effective radius of the surface area. The discontinuity(ies) include a generally circumferential groove around an inner portion of the coupling face of the pressure plate and, at each end of the generally circumferential groove, a wiper portion of the coupling face of the pressure plate extending inwardly toward an axis of rotation of the pressure plate(s).

15 Claims, 8 Drawing Sheets

PRESSURE PLATE

FIELD

This present invention relates to a pressure plate forming part of a friction clutch assembly. More particularly, but not exclusively, the present invention relates to a pressure plate forming part of a friction clutch assembly in a manual transmission for a car or other automobile.

BACKGROUND

This section provides background information related to the present disclosure which is not necessarily prior art.

A friction clutch assembly or "clutch" of a car or other automobile having a manual transmission is generally located between the engine and the drive train. The assembly normally includes three adjacent annular plates, including a flywheel that is rotatably driven by the crank shaft, a clutch plate (otherwise known as a driven plate), and a pressure plate that is biased by energy storing devices, such as one or more springs, towards the clutch plate and flywheel to clamp the clutch plate between the flywheel and the pressure plate.

The frictional engagement of the coupling faces of the clutch plate with the adjacent rotating coupling faces of the flywheel and the pressure plate allow the clutch plate to transfer power generated by the engine to the remainder of the drive train. To facilitate this frictional engagement, both the coupling faces of the clutch plate are lined with a frictional material that exhibits substantially stable coefficients of static and dynamic friction over a wide range of operating temperatures, including cooler starting temperatures and significantly hotter running temperatures. The frictional material needs to resist wear, be strong enough to withstand frequent heavy impact loading, particularly during starting, stopping and changing gears, and be non-aggressive against the adjacent coupling faces of the flywheel and the pressure plate.

The clutch functions to regulate the power being transmitted from the engine to the transmission and the drive shaft. When the clutch is disengaged when starting, stopping and changing of gears by depressing an associated clutch pedal that moves the pressure plate away from the clutch plate and the flywheel against the bias of the spring(s), smooth slippage is allowed between the engine and the transmission. Conversely, when the clutch is actively engaged by releasing the clutch pedal so that the spring(s) again bias the pressure plate towards the clutch plate and flywheel, slippage is prevented to maximise the amount of torque that is able to be transmitted from the engine to the drive train.

Two factors limiting the performance of conventional clutches are the maximum power or torque that can be transmitted from the engine to the drive train, and the heat generated by the frequent frictional engagement and disengagement between the coupling faces of the clutch plate and the adjacent coupling faces of the flywheel and the pressure plate. These are particularly evident in high performance cars that generate considerable torque, during intentional aggressive slipping of the clutch, and during frequent riding of the clutch by lesser skilled drivers.

The maximum power or torque that can be transmitted from the engine to the drive train is constrained by the total area and the coefficients of friction of the coupling faces of the clutch plate and the coupling faces of the flywheel and the pressure plate, and the clamping force of the spring. The first of these may be addressed by increasing the areas of the coupling faces by increasing the size of the clutch. However, increasing the diameter of the clutch plate requires additional material, not only for the clutch plate, but also the associated flywheel and pressure plate, and the surrounding clutch housing (or "bell housing"). Further, smaller or compact design cars, particularly front wheel drives, may be unable to accommodate a larger clutch and/or associated larger bell housing.

Another option for increasing the power or torque is to stiffen the spring(s) to increase the clamping force acting on the clutch plate. Correspondingly however, this leads to an increase in the force required to depress the clutch pedal that a user may find undesirable. In extreme circumstances, this can lead to problems such as fire wall flex where the clutch pedal is mounted, or even broken linkages to the clutch where the linkages are unable to withstand the frequent increased forces being transmitted.

The second limitation of conventional clutches relates to the heat generated between the coupling faces of the clutch and the adjacent coupling faces of the flywheel and pressure plate that can result in clutch fade. Clutch fade is effectively a loss of friction force as a result of the heating of the frictional material lining the clutch plate, and is generally caused by the heat resulting from the frequent frictional engagement between the clutch plate and the adjacent rotated flywheel and pressure plate increasing the temperature of the frictional material such that it is within the temperature range at which binder and other constituent frictional materials of the clutch plate tend to melt down and vaporize. The vapour becomes trapped between the adjacent coupling faces of the clutch plate and the flywheel and the pressure plate causing the coupling faces of the clutch plate to glide on blankets of vapour resulting in increased slippage of the clutch.

The applicant's International Patent Application No. PCT/AU2005/000921 discloses a previous design of pressure plate having a series of sweeping grooves to improve torque capacity of a clutch assembly. However, the applicant has determined that it would be highly desirable to provide a relatively small clutch assembly having an even further increased power or torque capacity, as well as reduced susceptibility to fade conditions.

SUMMARY

This section provides a general summary of the disclosure, and is not a comprehensive disclosure of its full scope or all of its features.

In accordance with the present disclosure, there is provided a pressure plate for use in a friction clutch assembly, the pressure plate comprising a substantially flat annular coupling face for frictional engagement with a coupling face of a clutch plate and one or more discontinuities formed in the coupling face of the pressure plate for decreasing a surface area of the coupling face of the pressure plate, the one or more discontinuities decreasing a greater relative proportion of the surface area closer to an inner radius of the coupling face of the pressure plate than an outer radius of the coupling face of the pressure plate to increase a mean effective radius of the surface area, wherein said one or more discontinuities includes a generally circumferential groove around an inner portion of the coupling face of the pressure plate and, at each end of the generally circumferential groove, a wiper portion of the coupling face of the pressure plate extending inwardly toward an axis of rotation of the pressure plate, the wiper portion(s) being arranged to wipe an inner annular portion of the coupling face of the clutch plate during use of the friction clutch assembly to prevent uneven wear of the clutch plate.

Preferably, the pressure plate includes a plurality of generally circumferential grooves formed around the inner portion of the coupling face of the pressure plate. More preferably, the generally circumferential grooves are evenly distributed around the inner portion of the pressure plate to maintain balance of the pressure plate.

Preferably, the generally circumferential grooves are arranged in end-to-end relationship to form an annular band around the inner portion of the pressure plate, each pair of neighbouring grooves being separated by one of said wiper portions.

In a preferred form, each of the grooves extends along its length to an inside edge of the coupling face of the pressure plate such that along said inside edge only the wiper portions form part of the surface area of the coupling face of the pressure plate.

Preferably, each of the grooves runs parallel to the inside edge of the coupling face.

It is preferred that each of the grooves has a width of between 5% and 40% of the distance between the inner radius and the outer radius of the coupling face. More preferably, each of the grooves has a width of between 15% and 25% of the distance between the inner radius and the outer radius of the coupling face.

Preferably, each of the grooves has a circumferential length substantially greater than a circumferential dimension of each wiper portion.

In a preferred form, each of the circumferential grooves corresponds with an outward groove, each outward groove defining a respective arc extending outwardly from the respective circumferential groove to at or near the outer radius. More preferably, each outward groove is formed such that a circumferential width of the groove relative the coupling face of the pressure plate progressively changes from the inner radius to the outer radius.

Preferably, the or each outward groove progressively changes from being generally tangential relative to the coupling face of the pressure plate at or near the inner radius to being generally radial relative to the coupling face of the pressure plate at or near the outer radius.

In one form, the or each outward groove is substantially straight.

Preferably, a radially outer portion of the or each groove trails a radially inner portion of the groove with respect to the or a direction of rotation of the pressure plate.

In a preferred form, the or each discontinuity presents a transitional interruption of the coupling face of the pressure plate to minimise point loading on an edge or edges of the discontinuity. More preferably, the edge(s) are radiused. Even more preferably, the edge(s) have a radius of about 5 millimeters.

Preferably, a depth of the or each discontinuity is about 0.5 millimeters or greater.

The increased mean effective radius of the coupling face correspondingly increases a net torque capacity of a clutch assembly when a form of the pressure plate and a corresponding clutch plate are engaged. For example, the net torque capacity between the coupling face of the pressure plate and the coupling face of the clutch plate formed from a friction coupling material may be empirically estimated as:

$$\tau = F_F \tilde{r}$$

where:
τ=net torque capacity
$F_F$=maximum frictional force acting on the clutch plate
$\tilde{r}$=mean effective radius of the surface areas (or contacting portions) of the coupling faces of the pressure plate and the clutch plate when they are frictionally engaged Hence, the net torque capacity, τ, may be increased by increasing either the frictional force, $F_F$ (as discussed above), or by increasing the mean effective radius, $\tilde{r}$, of the surfaces areas (or contacting portions) of the coupling faces.

The mean effective radius, $\tilde{r}$, of the surface area (or contacting portion) of the annular coupling face of the pressure plate is the area weighted average radius of the coupling face and may be approximated by:

$$\tilde{r} = \frac{r_1 a_1 + r_2 a_2 + \ldots + r_n a_n}{a_1 + a_2 + \ldots + a_n}$$

where:
$\tilde{r}$=mean effective radius
$r_n$=radius at $a_n$
$a_n$=area at $r_n$ $$I(r) = 2\pi r - Nw(r)$$

where:
I(r)=circumferential perimeter length of the contact face of the pressure plate at a radius r
w(r)=circumferential width of each groove at radius r
N=number of radially spaced apart groove(s)

$$da = I(r) \cdot dr = (2\pi 2 - Nw(r)) \cdot dr$$

$$\tilde{r} = \frac{\int_{r_1}^{r_2} r \cdot da}{\int_{r_1}^{r_2} da}$$

where:
$r_2$=outer radius of the annular coupling face of the pressure plate
$r_1$=inner radius of the annular coupling face of the pressure plate $$\tilde{r} = \frac{\int_{r_1}^{r_2} r(2\pi - Nw(r)) \cdot dr}{\int_{r_1}^{r_2} (2\pi 2 - Nw(r)) \cdot dr}$$

$$= \frac{\int_{r_1}^{r_2} (2\pi 2^2 - Nrw(r)) \cdot dr}{\int_{r_1}^{r_2} (2\pi 2 - Nw(r)) \cdot dr}$$

When each groove, the circumferential width of which determined by the function w(r) above, acts to remove proportionally more of the surface area of the coupling face of the pressure plate closer to the inner radius (smaller values of r) as compared to closer to the outer radius (larger values of r), the mean effective radius of the pressure plate is increased. This correspondingly increases the net torque capacity that is able to be applied to the clutch plate by the clamping action of the pressure plate thereupon. Advantageously, this facilitates the use of smaller clutches having a higher torque capacity than conventional clutches, which correspondingly facilitates a reduction in manufacturing costs, and more particularly material costs.

The groove width of the grooves may be determined by considering an acceptable amount of unsupported facing material of the coupling face and its effect on wear. That is, if the grooves are too wide, they may act to allow the friction facing of the clutch plate to deflect and increase the load presented on the edges of the grooves and they may also act to increase the likelihood of shudder/NVH ("Noise Vibration Harshness"). Preferably, the grooves have a relatively high aspect ratio to minimise deflection of the friction facing of the coupling face of the clutch plate and their effect on the wear of the clutch plate.

The groove width of each groove may be substantially constant along a length of the groove. Advantageously, each constant width groove is able to be formed by a single pass of a machining tool. Preferably, the groove width of each groove is not greater than about 10 millimeters.

It will be understood though that the grooves do not have to be all the same length, and also that the groove width of each groove could vary along its length.

In practice, it is expected that the selection of the depth of the grooves relative to the total section thickness of the pressure plate will be governed by the thermal fatigue characteristics of the particular pressure plate. It is contemplated that a material such as spheroidal graphite cast iron or nodular cast iron for example, may be used where structural integrity is restricting the application of grooves.

Preferably each outward groove extends from the inner radius to the outer radius to promote the passage and purging of air and wear debris trapped between the pressure plate and the clutch plate, and to allow volatile gases generated by frictional heating of the clamped together coupling faces of the pressure plate and the clutch plate in use to escape radially outwardly from between the adjacent faces and to effectively wipe and scrape clear and condition the coupling face of the clutch plate. The escaping/purging action is thought to be promoted by orienting the outward grooves such that a radially outer portion of each outward groove trails a radially inner portion of the groove with respect to the direction of rotation of the pressure plate in use. Advantageously, escaping/purging of the hot gases maintains the clutch at a cooler temperature during operation such that it is less susceptible to fade conditions.

The application and orientation of discontinuities formed in the coupling face of the pressure plate should be such that smooth modulation and engagement characteristics will be maintained. That is, the discontinuities should be formed in the coupling face of the pressure plate so as not to adversely affect either the balance, which may induce excessive shudder or NVH, or the structural integrity of the pressure plate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 an elevation view of a pressure plate having a plurality of grooves formed in a coupling face thereof;

Figure 1:
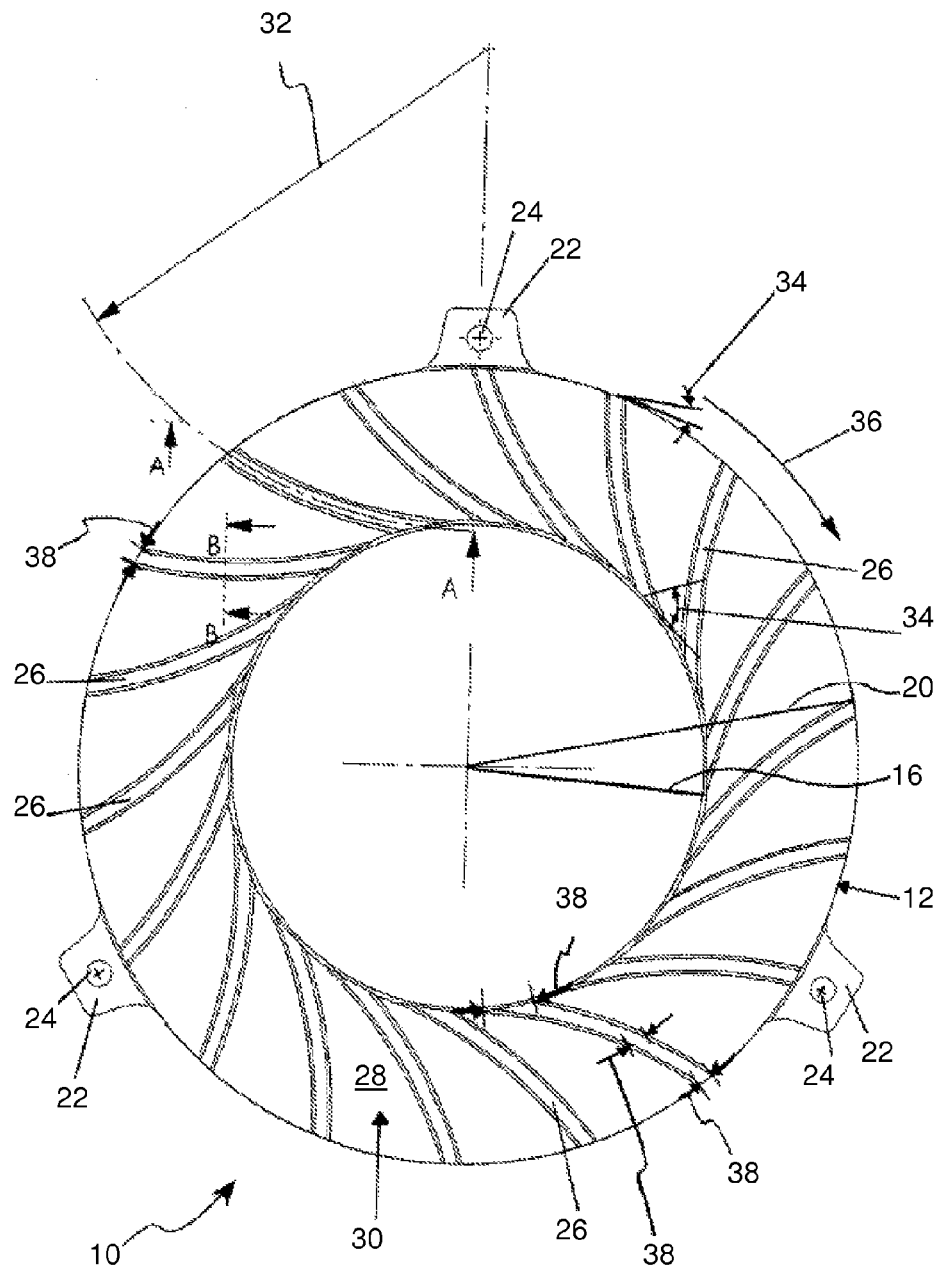
Figure 2:
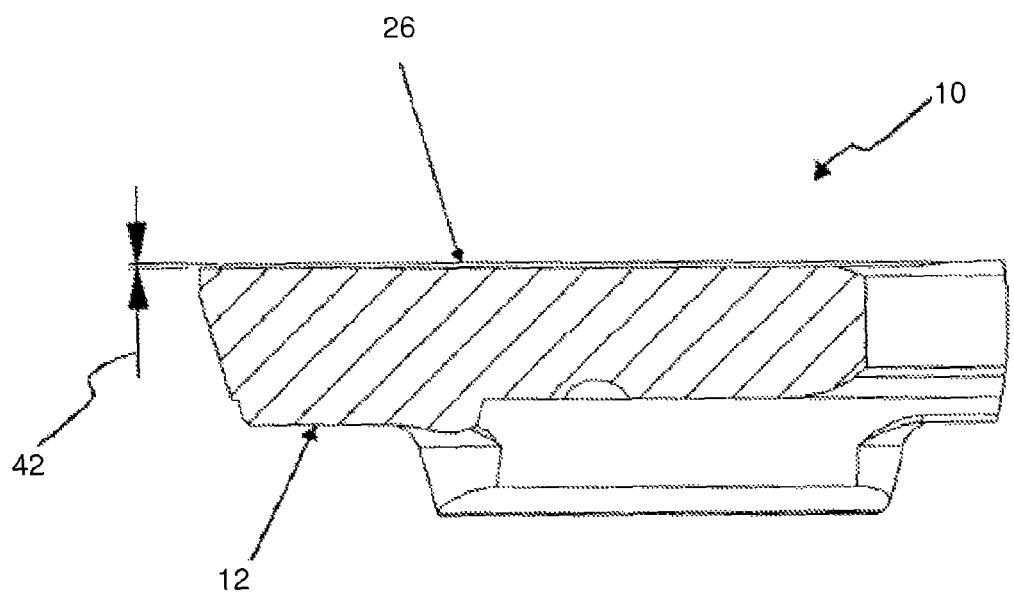
FIG. 2 is a partial section view of the pressure plate shown in FIG. 1 taken along line A-A.
Figure 3:
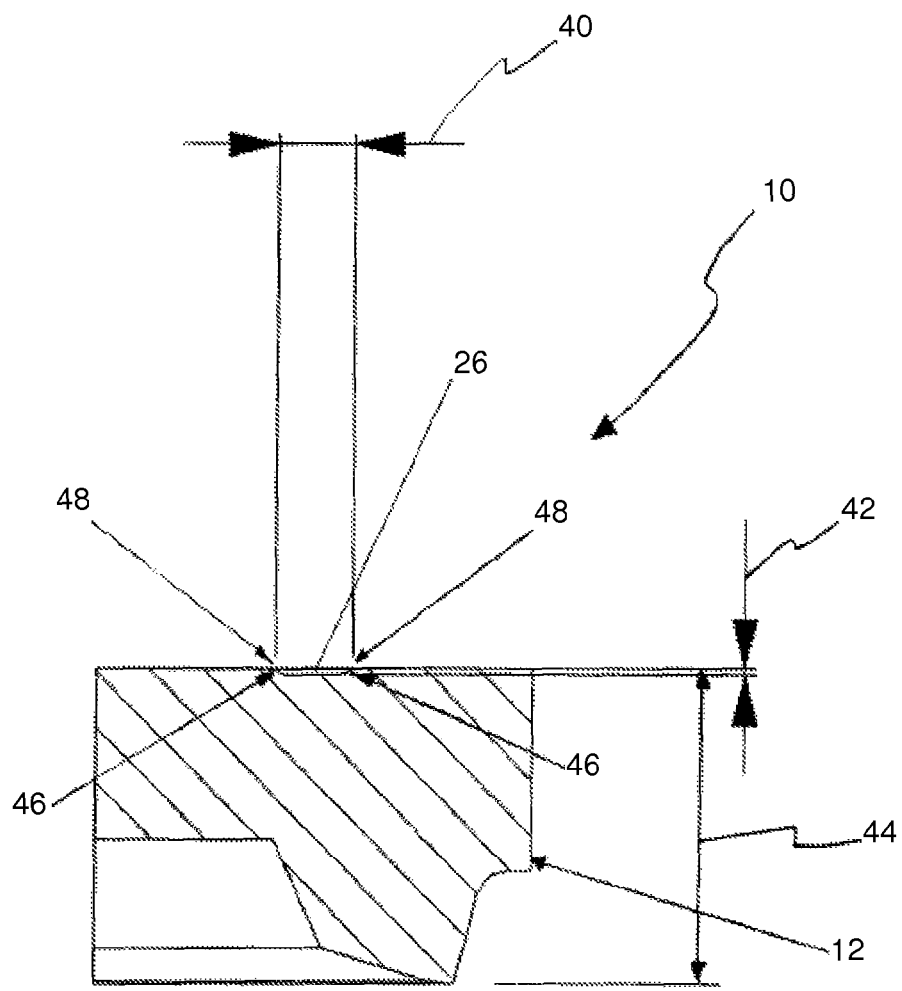
FIG. 3 is a partial section view of the pressure plate shown in FIG. 1 taken along line B-B.
Figure 4:
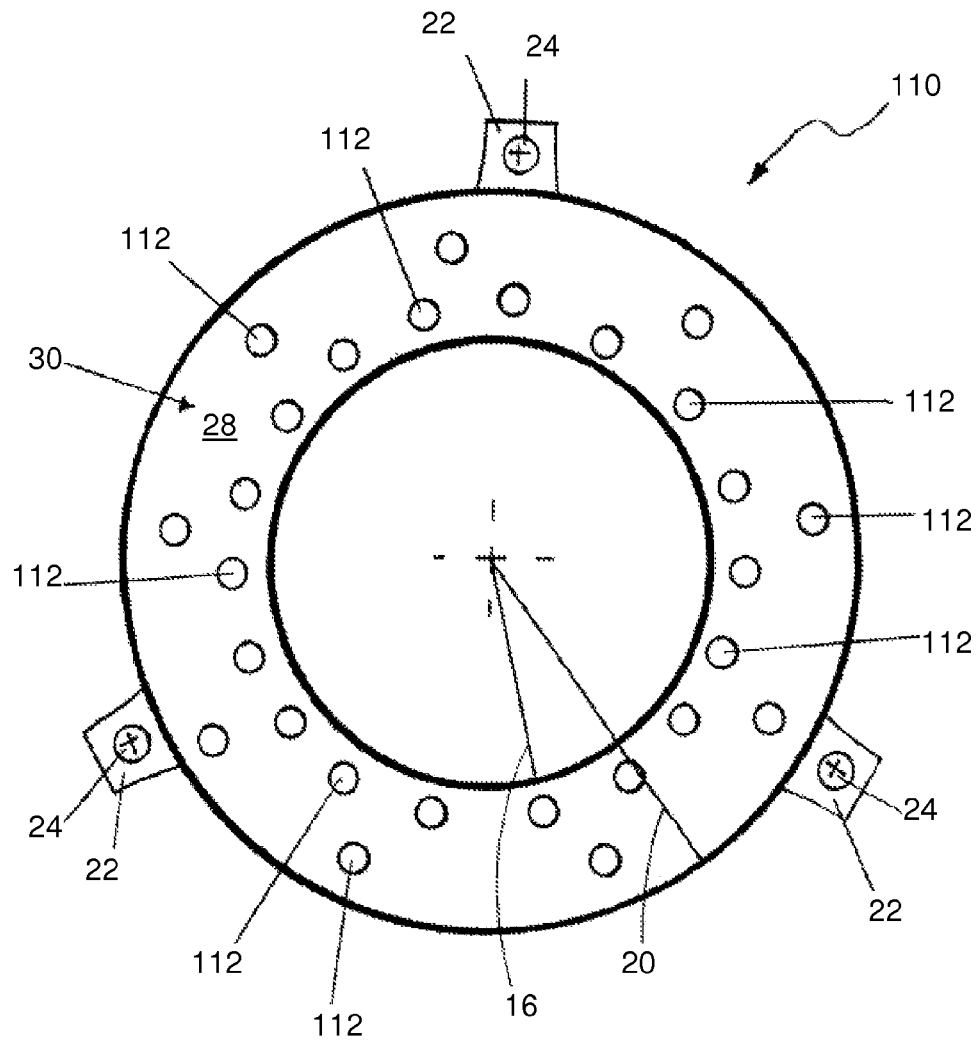
Figure 5:
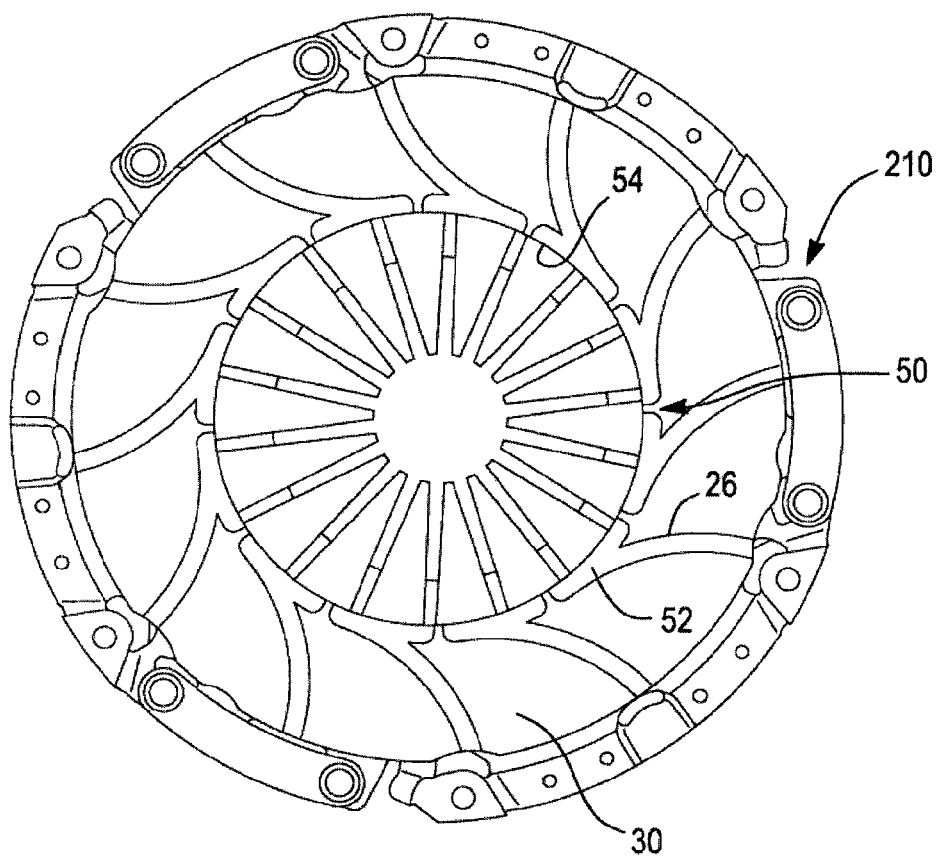
Figure 6:
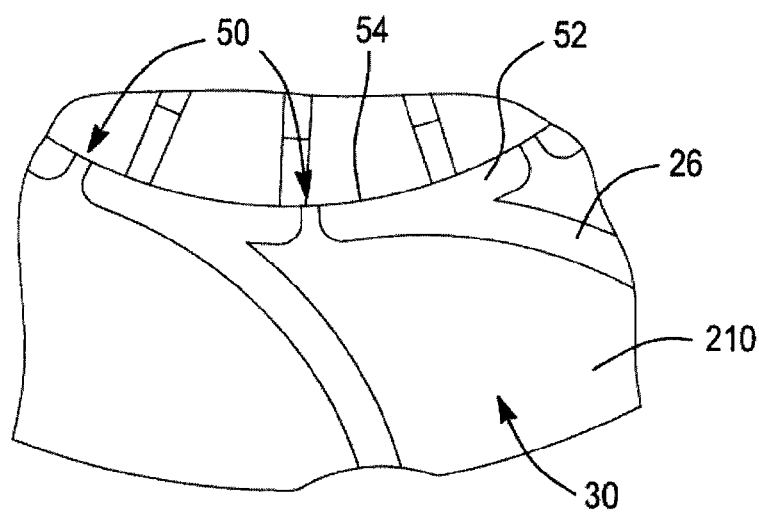
Figure 7:
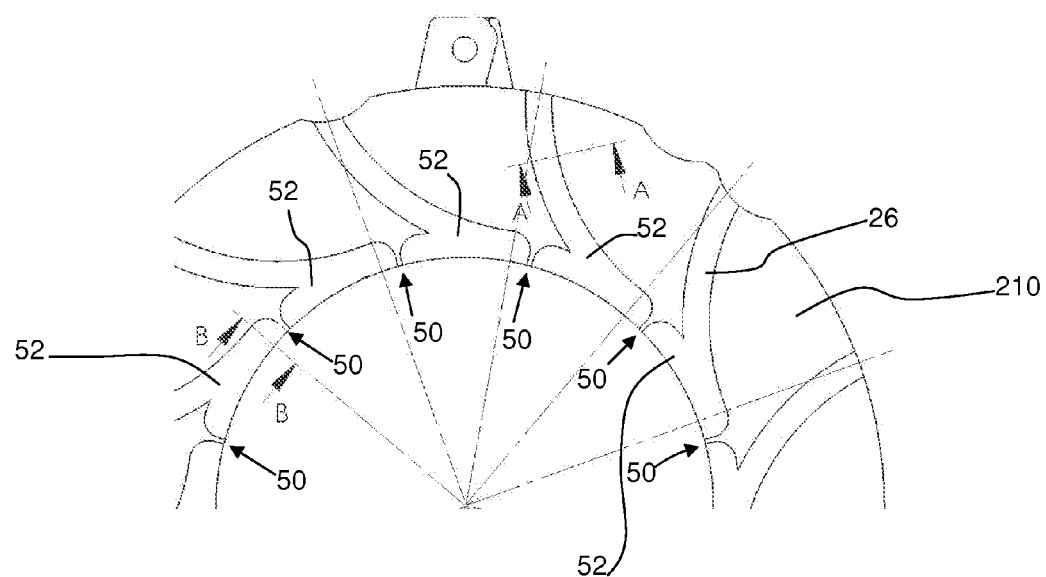
Figures 8, 9:
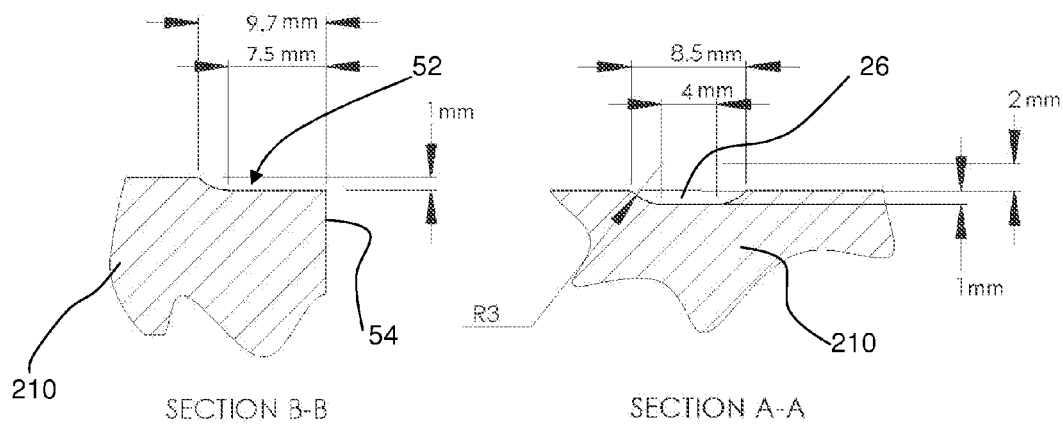
Figures 10A, 10B:
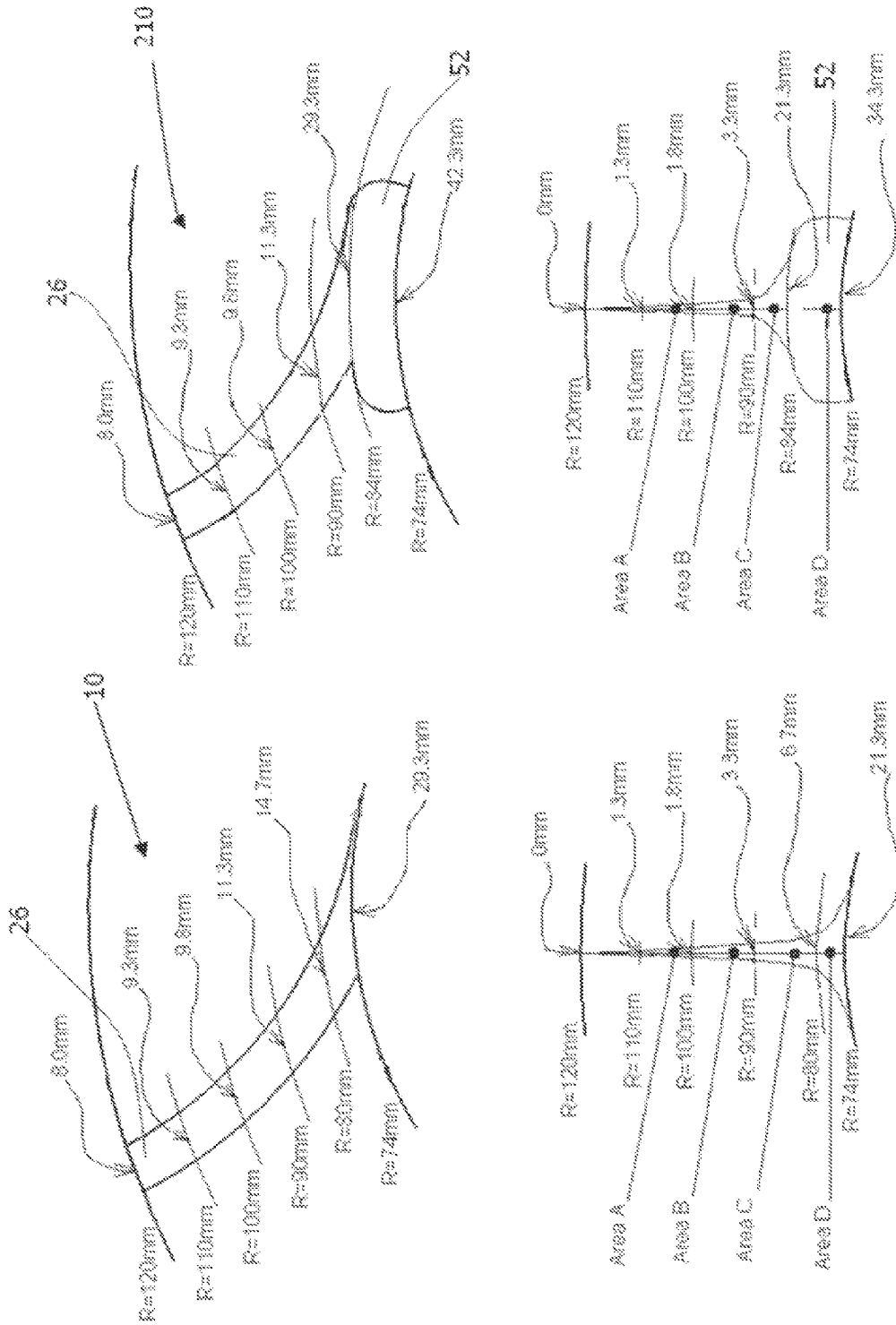
Figure 11:
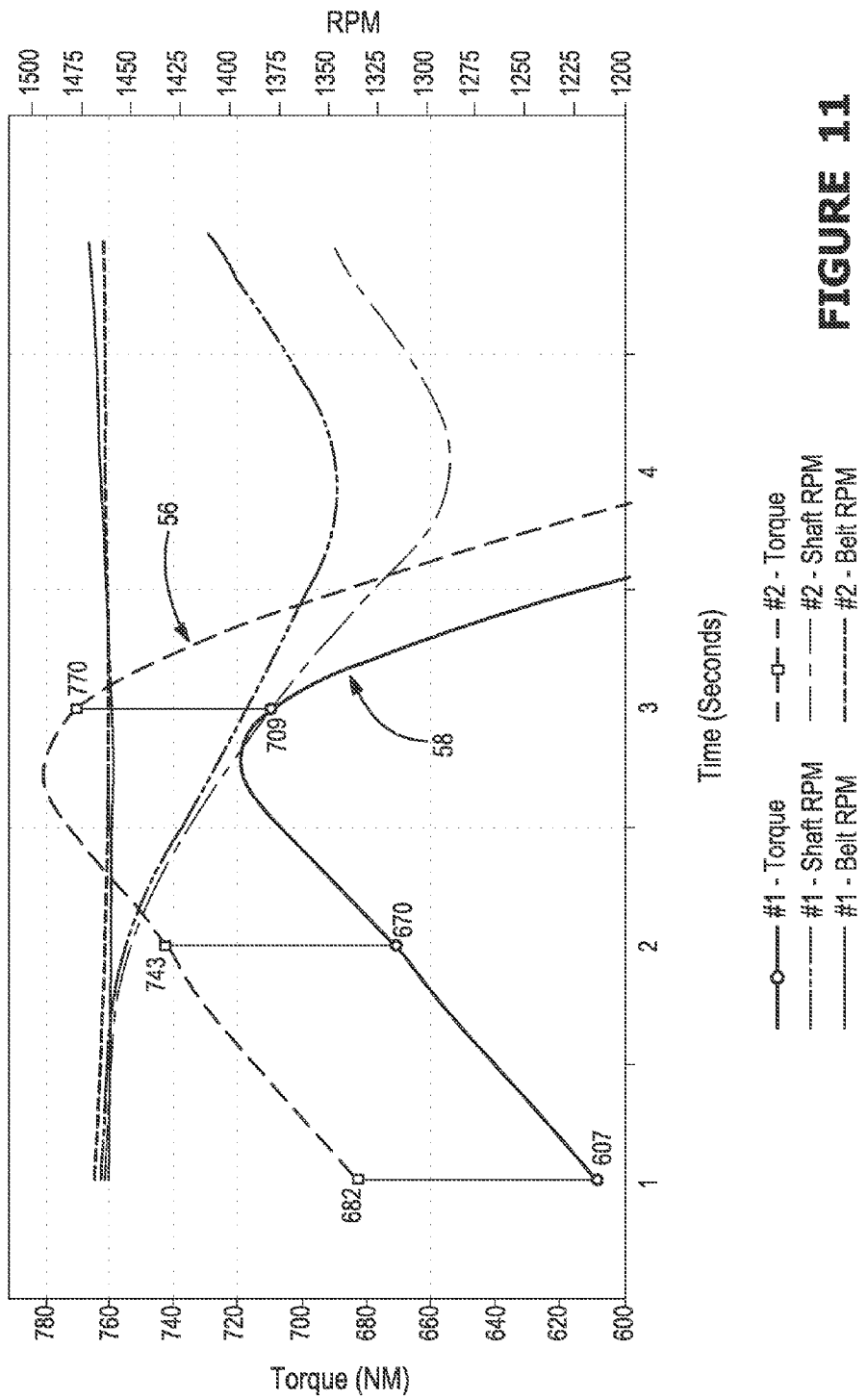

FIG. 4 an elevation view of an alternative pressure plate having a plurality of recesses or depressions formed in a coupling face thereof;

FIG. 5 shows an elevation view of an improved pressure plate having a plurality of circumferential grooves formed in a coupling face thereof, in accordance with an example of the present invention;

FIG. 6 shows detail of two circumferential grooves of the pressure plate shown in FIG. 5;

FIG. 7 shows detail of part of the pressure plate of FIG. 5;

FIG. 8 shows a cross-sectional view taken along line B-B shown in FIG. 7;

FIG. 9 shows a cross-sectional view of the pressure plate taken along line A-A shown in FIG. 7;

FIG. 10a shows detail of a groove of a pressure plate of the type shown in FIGS. 1 to 3;

FIG. 10b shows detail of a groove of the pressure plate shown in FIGS. 5 to 9; and FIG. 11 shows a graph of torque capacity of the pressure plate shown in FIGS. 5 to 9 when compared to a standard, non-grooved, pressure plate.

Corresponding reference numerals indicate corresponding parts throughout the several views of the drawings.

DETAILED DESCRIPTION

Example embodiments will now be described more fully with reference to the accompanying drawings.

A pressure plate 10 as disclosed in the applicant's International Patent Application No. PCT/AU2005/000921 is shown in FIGS. 1 to 3. The pressure plate 10 is formed by a generally annular plate 12 defined by an inner radius 16 and an outer radius 20, and includes several flange parts 22 having holes 24 formed therethrough by which the pressure plate 10 is able to be mounted to an associated clutch housing. The pressure plate 10 also includes a plurality of discontinuities in the form of equally radially spaced grooves or slots 26 that each generally define an arc extending from the inner radius 16 to the outer radius 20, each of the grooves 26 being formed in a flat planar friction surface 28 of a coupling face 30 of the pressure plate 10.

The arcuate grooves 26 decrease a greater relative proportion of a surface area or contacting portion of the coupling face 30 closer to the inner radius 16 than the outer radius 20 to increase a mean effective radius of the surface area. Each of the grooves 26 formed in the coupling face 30 follows a path defined by a portion of a circumference of a respective circle. For example, the circle followed by one groove 26 that is shown in the section view of FIG. 2 is defined by the radius 32 in FIG. 1.

It will be understood that both an angle of incidence 34 of each groove 26 to a direction of rotation 36 of the pressure plate 10 and a circumferential width 38 of each groove 26 change along the length of each groove 26 relative to the radius of the coupling face 30. The angle of incidence 34 of each groove 26 progressively changes relative to the radius of the coupling face 30 so that the circumferential width 38 of the grooves 26 progressively decreases from at or near the inner radius 16 to at or near the outer radius 20. More specifically, the grooves 26 progressively change from being generally tangential relative to the coupling face 30 at or near the inner radius 16, where the circumferential width 38 of each groove 26 is largest to remove the most material closer to the inner radius 16, to being generally radial relative to the coupling face 30 at or near the outer radius 20, where the circumferential width 38 of each groove 26 is smallest to remove the least material closer to the outer radius 20. As such, the arcuate nature of the grooves 26 acts to further increase the mean effective radius of the surface area of the coupling face 30.

The groove width 40 of each groove 26 is substantially constant along the length of the groove from the inner radius 16 to the outer radius 20, and may be about 4 to 10 millimeters, for example. Advantageously, each groove 26 is formed by a single pass of a machining tool, and preferably has a depth 42 of at least 0.5 millimeters deep, but not greater than say 2 to 5% of the total section thickness 44 of the pressure plate 10.

Advantageously, corner portions 46 of the grooves 26 are radiused such that the grooves 26 present a transitional interruption of the surface 28 to minimise point loading on edges 48 of each groove 26 in use that can result in premature wear and possibly excessive shudder/NVH. In one preferred form of the pressure plate 10, the radiused corner portions 46 of the grooves 26 may have radii of about 5 millimeters, for example.

It is thought that the escaping/purging of the hot gasses that are generated and become trapped between the coupling face 30 of the pressure plate 10 and an associated coupling face of a clutch plate (not shown) in use is promoted by a radially outer portion of each arcuate groove 26 trailing a radially inner portion of the groove 26 with respect to the direction of rotation 36 of the pressure plate 10 in use, as shown in FIG. 1.

It is also thought that the escaping/purging action is further promoted by each groove 26 extending from the inner radius 16 to the outer radius 20. Alternatively, each groove 26 may not extend fully to the inner radius 16 or fully to the outer radius 20.

An alternative pressure plate 110 as disclosed in the applicant's International Patent Application No. PCT/AU2005/000921 is shown in FIG. 4. The pressure plate 110 is similar to the pressure plate 10, and the same reference numerals have been used to indicate common features. The pressure plate 110 differs from the pressure plate 10 however, in that instead of a plurality of arcuate grooves 26, the pressure plate 110 includes one or more discontinuities in the form of recesses or depressions 112 formed in the friction surface 28 of the coupling face 30.

The pattern of recesses 112 of the pressure plate 110 is formed on the coupling face 30 such that the recesses 112 act to decrease a greater relative proportion of the surface area or contacting portion of the coupling face 30 closer to the inner radius 16 of the coupling face 30 than the outer radius 20 of the coupling face 30 to increase the mean effective radius of the surface area. As is shown in FIG. 4, preferably the pressure plate 110 has a greater concentration of recesses 112 formed near to the inner radius 16 than near to the outer radius 20 to further increase the mean effective radius.

It will be understood that while the recesses 112 are shown as circular depressions in FIG. 4, they could take other shapes. Further, like the grooves 26 formed in the coupling face of the pressure plate 10, the number, spacing and dimensions of the formed recesses 112 may also be varied to suit specific requirements, subject to the requirements to maintain the balance and the structural integrity of the pressure plate 110.

FIGS. 5 to 9 show an improved pressure plate 210 in accordance with an example of the present invention. The pressure plate 210 bears similarities to the pressure plate 10 shown in FIG. 1, and the same reference numerals have been used to indicate common features. The pressure plate 210 differs from the pressure plate 10 however, in that it incorporates a significant design improvement whereby a ring of material is effectively removed from around the inner radius 16 of the pressure plate 210, with a series of wiper portions 50. By removing a substantially circular ring of material from around the inner radius 16 in this way, the mean effective radius of the surface area of the coupling face 30 is further increased so as to further increase the torque capacity of the pressure plate 210.

However, the applicant has determined that simply removing a substantially circular ring of material would result in friction material on the clutch plate wearing with a stepped edge at a location corresponding to an outer edge of the region from where the ring of material has been removed. The applicant has determined that such a stepped edge may be prevented by incorporating the wiper portions 50.

In other words, when the friction material on the clutch plate is larger than the pressure plate 210, the clutch plate wears out with a step. This step can cause shudder and unwanted NVH in a clutch assembly, and should thus be avoided. The wiper portions 50 ensure the whole of the friction material on the clutch plate wears evenly, but has only minimal effect on the mean effective radius of the surface area of the coupling face 30. In this way, torque capacity is increased without stepped wear and consequential NVH and shudder problems.

More specifically, with reference to FIGS. 5 to 7, the improved pressure plate 210 has a plurality of discontinuities in the form of generally circumferential grooves 52 formed around an inner portion of the coupling face 30 of the pressure plate 210. At each end of each generally circumferential groove 52, there is a wiper portion 50 of the coupling face 30 of the pressure plate 210. The wiper portions 50 extend inwardly toward an axis of rotation of the pressure plate 210 and are arranged to wipe an inner annular portion of the coupling face of the clutch plate during use of the friction clutch assembly to prevent uneven wear of the clutch plate.

The generally circumferential grooves are evenly distributed around the inner portion of the pressure plate 210 so as to maintain balance of the pressure plate 210 during operation of the friction clutch assembly. The generally circumferential grooves 52 are arranged in end-to-end relationship to form an annular band around the inner portion of the pressure plate 210, each pair of neighboring circumferential grooves 52 being separated by a single wiper portion 50.

As can be seen clearly in FIG. 6, each of the circumferential grooves 52 extends along its length to an inside edge 54 of the coupling face 30 of the pressure plate 210 such that along the inside edge 54 only the wiper portions 50 form part of the surface area of the coupling face 30 of the pressure plate 210. In the example depicted, each of the grooves 52 runs circumferentially and parallel to the inside edge 54 of the coupling face 30. However, it will be appreciated by those skilled in the art that, in alternative examples, the grooves 52 may be only generally circumferential, and may not necessarily run precisely in parallel to the inside edge 54 of the coupling face 30.

Each of the circumferential grooves 52 corresponds with an outward groove 26, each outward groove 26 defining a respective arc extending outwardly from the respective circumferential groove 52 to at or near the outer radius 20. More specifically, as shown clearly in FIGS. 5 to 7, each of the outward grooves runs outwardly from a front end of the respective circumferential groove 52. Each outward groove 26 may be formed such that a circumferential width of the outward groove 26 relative to the coupling face 30 of the pressure plate 210 progressively changes from the inner radius 16 to the outer radius 20, and this may be achieved by forming the outward grooves 26 to progressively change from being generally tangential at the respective circumferential groove 52 to being generally radial at or near the outer radius 20.

As depicted in the pressure plate 10 shown in FIG. 1, a radially outer portion of each outward groove 26 trails a radially inner portion of the outward groove 26 with respect to the direction of rotation of the pressure plate 210.

FIG. 8 shows a cross-section of a circumferential groove 52 taken along line B-B of FIG. 7, and FIG. 9 shows a cross-section of an outward groove 26 taken along line A-A of FIG.

7. With reference to FIG. 8, each of the grooves 52 has a width of between 5% and 40% of a distance between the inner radius 16 and the outer radius 20 of the coupling face 30. More preferably, each of the circumferential grooves 52 has a width of between 15% and 25% of the distance between the inner radius 16 and the outer radius 20 of the coupling face 30. In the specific arrangement shown, the circumferential groove has a width of 9.7 mm, the inner radius 16 is 74 mm and the outer radius 20 is 120 mm. Accordingly, in the example shown, the width of each of the circumferential grooves 52 is approximately 21% of the distance between the inner radius 16 and the outer radius 20 of the coupling face 30. The circumferential groove has a depth of 1 mm, and is radiused from the outer edge of the circumferential groove 52 downwardly to a flat portion of the circumferential groove 52 which has a width of 7.5 mm. FIG. 8 shows clearly that the circumferential groove 52 extends to the inside edge 54 of the coupling face 30 of the pressure plate 210, as described above.

Referring to FIG. 9, the outward groove 26 has a width of 8.5 mm, and is radiused on either side down to a flat portion which has a width of 4 mm. The outward groove 26 has a depth of 1 mm, the same as the depth of the circumferential groove 52. A centre of the circle forming the basis for the radiused edge of the outward groove 26 is located 2 mm above the surface of the coupling face 30.

The applicant has identified that the improved pressure plate 210 may provide more than four times the torque capacity improvement over the pressure plate 10 shown in FIG. 1. That is, circumferential grooves 52 forming a ring with an effective width in the order of 8 mm at the inner radius 16 with wiper portions 50 can improve the torque capacity by 8%. The pressure plate 10 having outward grooves 26 but not circumferential grooves 52 has a torque capacity improvement in the order of 2% over a standard non-grooved pressure plate.

With reference to FIGS. 10a and 10b, there is shown an example with and without the circumferential grooves 52 at the inner radius 16 so as to demonstrate the effect of removing a ring of material from the inner radius 16 of the pressure plate 210. Approximate calculations of the areas of material removed have been made, and these areas are then converted to an equivalent amount of material removed from the inner radius 16. FIG. 10a shows the profile of a single outward groove 26 of the pressure plate 10 shown in FIG. 1, and FIG. 10b shows the profile of a single outward groove 26 and corresponding circumferential groove 52 of the improved pressure plate 210 shown in FIG. 5.

For each of the pressure plates 10, 210, the inner radius is 74 mm and the outer radius is 120 mm, and measurements of circumferential width of the grooves were taken at radius lengths of 84 mm, 90 mm, 100 mm and 110 mm, as well as at the inner and outer radiuses. The circumferential width measurements taken at these locations are shown in the upper diagrams in FIGS. 10a and 10b.

So as to estimate the torque capacity based on these measurements, as net torque is directly related to the mean effective radius of the surface area of the coupling face of the pressure plate and the clutch plate when they are frictionally engaged as per the equation provided earlier in the specification, the mean effective radius of the grooves shown in FIGS. 10a and 10b were estimated as follows. To simplify the calculation, the width (8 mm) of the outward grooves at the outer radius 20 was subtracted from each of the measurements so as to arrive at the dimensions shown in the lower diagrams in FIGS. 10a and 10b. Using these measurements, and interpolating between them, the sum of areas A, B, C and D for each of the diagrams was calculated as shown in the table below. The left-hand column corresponds to FIG. 10a, and the right-hand column corresponds to FIG. 10b. By virtue of the subtraction of the width of the groove at the outer radius 20, the calculation is further simplified by assuming that the total area of material removed is located at the inner radius 16, facilitating calculation of the equivalent inside radius of the pressure plates 10, 210.

| | |
|---|---|
| Area A = ½(1.3 + 1.8)10 = 15.5 | Area A = ½(1.3 + 1.8)10 = 15.5 |
| Area B = ½(1.8 + 3.3)10 = 25.5 | Area B = ½(1.8 + 3.3)10 = 25.5 |
| Area C = ½(3.3 + 6.7)10 = 50.0 | Area C = ½(3.3 + 21.3)6 = 73.8 |
| Area D = ½(6.7 + 21.3)6 = 84.0 | Area D = ½(30 + 34.3)10 = 321.5 |
| Total Area = 175 × 12 grooves = 2100 sqmm | Total Area = 436 × 12 grooves = 5236 sqmm |
| Removing this amount of material from the ID gives an equivalent ID of - 3.14($R_o^2 - 74^2$) = 2100 | Removing this amount of material from the ID gives an equivalent ID of - 3.14($R_o^2 - 74^2$) = 5236 |
| $R_o$ = 78.4 | $R_o$ = 84.5 |
| So the new equivalent inside radius of the Pressure Plate is 78.4 mm. This gives the new Mean Effective Radius of - MER = ⅔ (($R_o^3 - R_i^3$)/($R_o^2 - R_i^2$)) = ⅔ (($120^3 - 78.4^3$)/($120^2 - 78.4^2$)) = 100.7 | So the new equivalent inside radius of the Pressure Plate is 84.5 mm. This gives the new Mean Effective Radius of - MER = ⅔ (($R_o^3 - R_i^3$)/($R_o^2 - R_i^2$)) = ⅔ (($120^3 - 84.5^3$)/($120^2 - 84.5^2$)) = 103.3 |
| MER of the plain non grooved Pressure Plate = ⅔ (($R_o^3 - R_i^3$)/($R_o^2 - R_i^2$)) = ⅔ (($120^3 - 74^3$)/($120^2 - 74^2$)) = 98.8 | MER of the plain non grooved Pressure Plate = ⅔ (($R_o^3 - R_i^3$)/($R_o^2 - R_i^2$)) = ⅔ (($120^3 - 74^3$)/($120^2 - 74^2$)) = 98.8 |
| This Groove gives a 2% increase of MER | This Groove gives a 4.5% increase of MER 2.25 times more than the previous design. |

Accordingly, using the above calculations, the groove design of the improved pressure plate 210 provides an increase of mean effective radius (and therefore torque capacity) 2.25 times more than the design of the pressure plate 10 shown in FIG. 1.

In dynamometer testing, the applicant found that the wiper portions 50 had minimal effect on the mean effective radius, and that they could be ignored in estimating the improved torque capacity. Accordingly, the calculation can be simplified to areas A, B and C shown above as the total area removed, i.e.

Area A=15.5
Area B=25.5
Area C=73.8
Total Area=114.8×12 grooves=1,377 sqmm

Ignoring the wiper portions 50 and thus using an inner radius of 84 mm, the equivalent inside radius of the pressure plate is calculated by the following:

$$3.14(R_o^2 - 84^2) = 1377$$

$$R_o = 86.6$$

So the new equivalent inside radius of the Pressure Plate is 86.6 mm. This gives the new Mean Effective Radius of—

$$\begin{aligned} MER &= 2/3((R_o^3 - R_i^3)/(R_o^2 - R_i^2)) \\ &= 2/3((120^3 - 86.6^3)/(120^2 - 86.6^2)) \\ &= 104.2 \end{aligned}$$

$$\begin{aligned} MER \text{ of the plain non grooved Pressure Plate} &= 2/3((R_o^3 - R_i^3)/(R_o^2 - R_i^2)) \\ &= 2/3((120^3 - 74^3)/(120^2 - 74^2)) \\ &= 98.8 \end{aligned}$$

Accordingly, the combined outward groove 26 and circumferential groove 52 of the pressure plate 210 gives an estimated 5.4% increase in an effective radius (and therefore torque capacity), 2.7 times the increase of the pressure plate design 10 shown in FIG. 1.

With reference to FIG. 11, there is shown a graph of torque capacity of the improved pressure plate 210 (see line labeled 56) and the torque carrying capacity of a standard non-grooved pressure plate (see line labeled 58). By optimizing the geometry of the pressure plate 210, further improvements were made to achieve greater than an 8% increase in mean effective radius, or 4 times the improvement of the pressure plate 10 shown in FIG. 1.

In use in a clutch assembly of a manual transmission car (not shown) in the conventional manner, for example, the pressure plate 10 (or similarly pressure plate 110) is mounted to the clutch cover. The clutch cover is mounted to a flywheel that is in turn mounted on and rotationally driven by the engine crankshaft such that the flywheel is rotatably driven at the same speed as the engine.

A clutch plate having opposed friction faces in the form of coupling faces is mounted to a drive shaft that leads to the remainder of the drive train and is sandwiched between a coupling face of the flywheel and the coupling face 30 of the pressure plate 10. The clutch may be engaged and disengaged by using a clutch pedal connected to the clutch by an associated linkage, for example.

When the engine is running, the flywheel rotates at the same speed as the engine. When the clutch is engaged by releasing the clutch pedal, one or more springs disposed in the clutch housing act to bias the pressure plate 10 towards the flywheel and the clutch plate so that the rotating coupling face of the flywheel and coupling face 30 of the pressure plate 10 contact the coupling surfaces of the clutch plate to clamp the clutch plate therebetween, with the coupling faces of the clutch plate frictionally engaging the adjacent coupling face of the flywheel and the adjacent coupling face 30 of the pressure plate 10. The driven clutch plate is then able to transfer power from the engine to the drive shaft and the remainder of the drive train.

The grooves 26 and 52 formed in the coupling face 30 of the pressure plate 10 advantageously increase the mean effective radius of the surface area coupling face 30 of the pressure plate 10 by removing proportionally more material from the coupling face 30 of the pressure plate 10 closer to the inner radius 16 than the outer radius 20. In consequence, the net power or torque that is able to be transferred from the engine to the clutch plate is increased. This allows smaller clutches to be manufactured having an equivalent performance to larger conventional clutches. The pressure plate 10 having the grooves 26 and 52 may also be used in larger clutches to provide improved performance in higher performance vehicles.

It is also thought that the grooves 26 and 52 advantageously serve to maintain an operating temperature of the clutch in use at a lower temperature. This may result in the clutch being less susceptible to fade conditions.

When the clutch is disengaged by depressing the associated clutch pedal, a throwout bearing associated with the clutch acts against the spring(s) to bias the pressure plate 10 away from the flywheel and the clutch plate against the bias of the spring(s). This unlocks the clutch plate from rotation by the engine, to thereby allow smooth slippage between the engine and the clutch plate.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A pressure plate for use in a friction clutch assembly, the pressure plate comprising:

a substantially flat annular coupling face for frictional engagement with a coupling face of a clutch plate; and one or more discontinuities formed in the coupling face of the pressure plate for decreasing a surface area of the coupling face of the pressure plate, the one or more discontinuities decreasing a greater relative proportion of the surface area closer to an inner radius of the coupling face of the pressure plate than an outer radius of the coupling face of the pressure plate to increase a mean effective radius of the surface area;

wherein said one or more discontinuities includes a plurality of generally circumferential grooves around an inner portion of the coupling face of the pressure plate and, at each end of each groove, a wiper portion of the coupling face of the pressure plate extending inwardly toward an axis of rotation of the pressure plate, the wiper portions being arranged to wipe an inner annular portion of the coupling face of the clutch plate during use of the friction clutch assembly to prevent uneven wear of the clutch plate;

the grooves being arranged in an end-to-end relationship to form an annular band around the inner portion of the pressure plate, each pair of neighboring grooves being separated by one of said wiper portions, and each of the grooves having a width of between 5% and 40% of the distance between the inner radius and the outer radius of the coupling face.

2. A pressure plate as claimed in claim 1, wherein each of the grooves extends along a length of the groove to an inside edge of the coupling face of the pressure plate such that along said inside edge only the wiper portions form part of the surface area of the coupling face of the pressure plate.

3. A pressure plate as claimed in claim 2, wherein each of the grooves runs parallel to the inside edge of the coupling plate.

4. A pressure plate as claimed in claim 1, wherein each of the grooves has a width of between 15% and 25% of the distance between the inner radius and the outer radius of the coupling face.

5. A pressure plate as claimed in claim 1, wherein each of the grooves has a circumferential length substantially greater than a circumferential dimension of each wiper portion.

6. A pressure plate as claimed in claim 1, wherein each of the circumferential grooves corresponds with an outward groove, each outward groove defining a respective arc extending outwardly from the respective circumferential groove to at or near the outer radius.

7. A pressure plate as claimed in claim 6, wherein each outward groove is formed such that a circumferential width of the outward groove relative the coupling face of the pressure plate progressively changes from the inner radius to the outer radius.

8. A pressure plate as claimed in claim 6, wherein the or each outward groove progressively changes from being generally tangential relative to the coupling face of the pressure plate at or near the inner radius to being generally radial relative to the coupling face of the pressure plate at or near the outer radius.

9. A pressure plate as claimed in claim 6, wherein each outward groove is substantially straight.

10. A pressure plate as claimed in claim 6, wherein a radially outer portion of each outward groove trails a radially inner portion of the outward groove with respect to a direction of rotation of the pressure plate.

11. A pressure plate as claimed in claim 1, wherein the or each discontinuity presents a transitional interruption of the coupling face of the pressure plate to minimise point loading on an edge of the discontinuity.

12. A pressure plate as claimed in claim 11, wherein the edge is radiused.

13. A pressure plate as claimed in claim 12, wherein the edge has a radius of about 5 millimeters.

14. A pressure plate as claimed in claim 1, wherein a depth of the or each discontinuity is about 0.5 millimeters or greater.

15. A pressure plate for a friction clutch assembly, the pressure plate comprising:

a substantially flat annular coupling face for frictional engagement with a coupling face of a clutch plate;

a plurality of first grooves, each first groove generally extending from an inner radius of the coupling face to an outer radius of the coupling face;

a plurality of second grooves, the plurality of second grooves arranged generally adjacent to one another in an end-to-end relationship circumferentially around the inner radius of the coupling face; and a plurality of generally radially extending wiper portions in the coupling face and located between adjacent ones of the plurality of second grooves, the wiper portions operable to wipe an inner annular portion of the coupling face of the clutch plate during use of the friction clutch assembly to prevent uneven wear of the clutch plate.

* * * * *